Patented Oct. 29, 1929

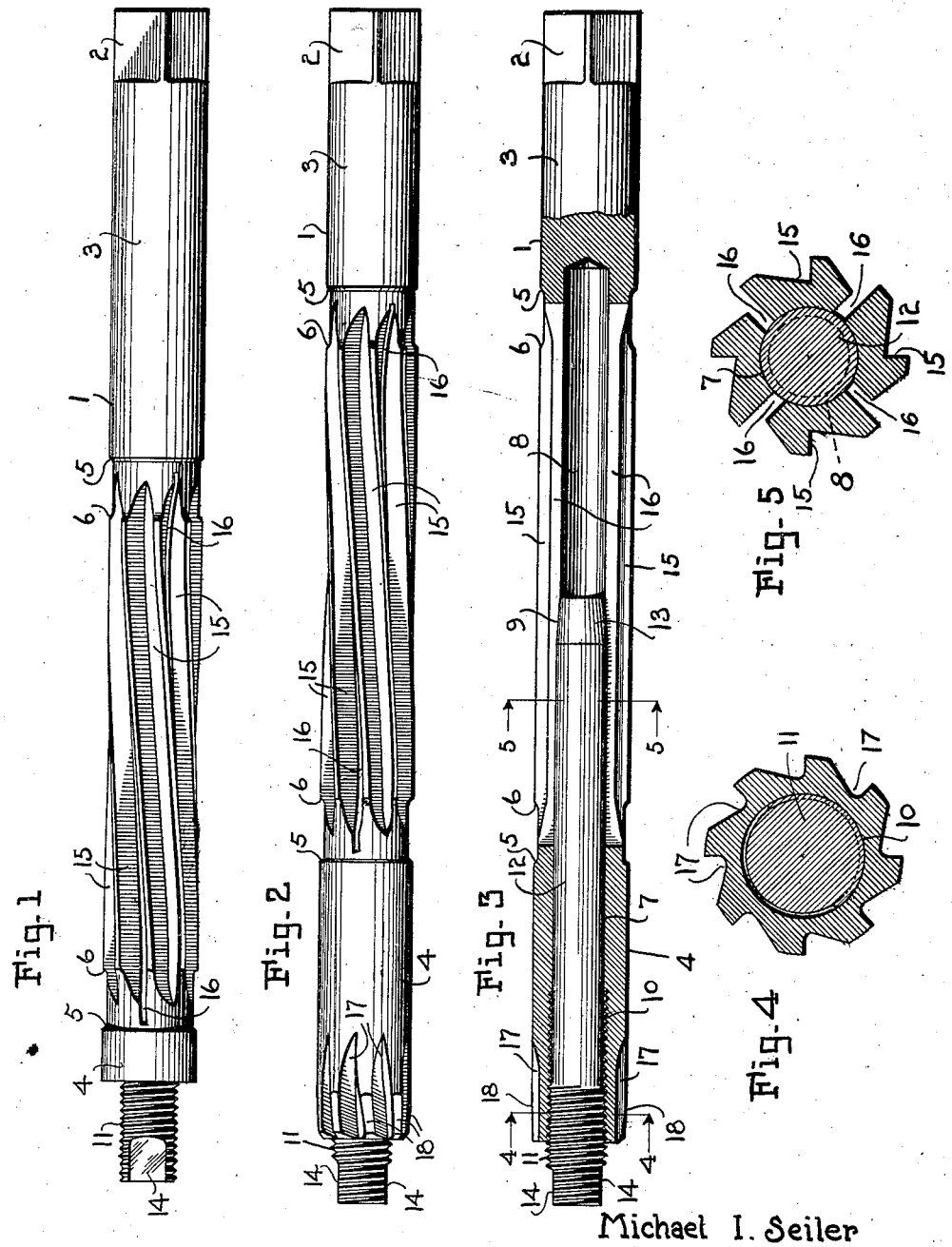

1,733,912

UNITED STATES PATENT OFFICE

MICHAEL I. SEILER, OF MILLERSBURG, PENNSYLVANIA, ASSIGNOR TO KEYSTONE REAMER AND TOOL COMPANY, OF MILLERSBURG, PENNSYLVANIA, A CORPORATION OF PENNSYLVANIA

REAMER

Application filed June 8, 1922. Serial No. 566,791.

The invention relates to reamers.

The object is to provide a reamer, which may be made in any desired size and formed of one integral piece of steel, to provide longitudinally disposed spiral cutting ribs extending throughout the major portion of the length of the reamer, said ribs being capable of being expanded or contracted to adjust the amount of cut thereof as desired.

Another object is to provide such a reamer having its ends formed into a front and rear pilot member respectively, so as to act as guiding means for the reamer during its passage through alined openings, such as the openings in piston pin bushings in automobile pistons, etc. to insure perfect alinement of the reamer, and to produce a true cut.

A further object is to provide a one-piece reamer wherein the cutting ribs are spirally arranged with relation to the longitudinal axis of the reamer, such spiral formation resulting in a more perfect reaming operation, by producing a shear cut in removing the metal.

A full and complete understanding of the invention may be obtained from a consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a side elevation of one form of the improved reamer;

Figure 2 is a similar view of a slightly modified form of the reamer;

Figure 3 is a longitudinal sectional view of the reamer shown in Figure 2;

Figure 4 is a transverse sectional view, taken on the line 4—4 of Figure 3;

Figure 5 is a similar view taken on the line 5—5 of Figure 3.

In its preferred form the invention employs a bar or rod 1, of steel of the desired diameter and length, depending on the size of the tool, said rod having a polygonal head 2 formed at one end for the purpose of attachment to a drill press or other turning means, not shown. Adjacent to the head 2, the bar is of a uniform diameter for a distance, and this diameter is equal to the desired diameter of the bushing or other bearing, etc. after reaming, and hence the bar is adapted to snugly fit, though freely turn, in the bushing after reaming, thus acting as a rear pilot or bearing 3 for the tool while reaming out an alined bushing, as will become apparent.

At the opposite end the said bar is left smooth for a distance to provide a front pilot or bearing 4, of slightly less diameter than the rear pilot, and adapted to snugly fit and to freely turn in the bushing, etc. before the same is reamed by the cutting teeth, which are formed of the metal of the bar between the said front and rear pilots. Annular shoulders 5 are formed at the opposed ends of the pilots, and for a short distance the bar 1 is slightly reduced in diameter to afford clearance for the cutting tool when machining the spiral ribs in a manner to be described, such reduction ending in the opposed shoulders 6, between which the original diameter of the bar 1 is retained.

A longitudinal bore or passageway 7 extends from the front end of the bar 1 slightly into the rear pilot 3, as clearly shown in Figure 3 of the drawing, the inner portion 8 of the bore extending from a point substantially midway between the shoulders 5 to the inner end, being of somewhat smaller diameter, and the two portions 7, 8 being joined by a conical, inclined wall 9. At the outer end, the bore 7 is slightly enlarged and provided with internal threads 10, into which is adapted to be engaged the threaded end 11 of an expanding bar 12, round in cross section and of a diameter to snugly fit the larger, outer portion 7 of the bore. The inner end of the expanding bar 12 is tapered to form a conical end 13, the walls of which correspond to the conical walls 9 of the bore, and at the outer end, the expander is preferably provided with flattened surfaces 14 for the reception of a wrench, for turning the expander and advancing or returning the expander longitudinally of the reamer.

Spirally formed grooves or flutes 15 are cut in the enlarged portion of the bar 1 between the shoulders 6 and these grooves extend longitudinally and spirally to define cutting ribs, one wall of each rib being radially disposed to provide a cutting edge, and the other wall being tangentially disposed with relation to the axis of the bar as shown in Figs. 4 and 5, so that when the reamer is turned while at work, the straight radial wall will engage the metal of the bushing, or other work, and ream the same in the usual manner.

In the bottom of every alternate flute or groove 15, a slot 16 is provided which extends entirely through the wall of the reamer and communicates with the longitudinal bore therein, so as to provide sufficient resiliency to the pairs of ribs to permit the same to be expanded throughout their central portions when the expanding bar 12 is advanced into the bore and its tapered or conical end engaged with the interior, conical wall 9. When the expander is withdrawn, the resiliency of the ribs is such as to return them to normal position, in which they assume the original diameter of the active portion of the reamer. The number of flutes and the number of slots extending through the walls of the reamer depends on the size and diameter of the reamer, as will be understood. It has been found that the integral construction of the cutting ribs of the reamer provides ample strength, when the tapered end of the expander is in contact with the tapered walls 9, to prevent any inward movement of the ribs under strain.

In Figure 2 of the drawing, the front pilot 4 is somewhat extended and provided with cutting teeth 17, which are preferably arranged spirally and extend substantially one-third the length of the said pilot 4, the outer ends of the ribs being tapered as at 18 to facilitate their entrance into a bushing. When the reamer is caused to turn and to advance in the usual manner of reaming, the cutting teeth 17 will remove sufficient metal, or inequalities in the metal, to allow the front pilot to pass freely into the first of a pair of alined bearings or bushings, such as the piston bushings in an automobile piston. When the front pilot has passed through the first bearing, and the ribs 15 are starting to work on the same, the teeth 17 begin to engage with the second bearing or bushing and to clear a passage for the front pilot, when the reamer is in perfect alinement with the work. After the reamer proper has acted on the first bearing and begins to engage the second, the rear pilot, which is of the diameter of the completed work, then enters the first bushing and forms a perfect bearing for the reamer, afterwards entering the second bushing when the cutting ribs 15 have completed their work on the said second bushing.

The one-piece structure of the reamer proper has been found to be of great advantage from an economical point of view, as the reamer may be readily made from a single bar of steel by proper methods of machining, the bore or passage together with the various other features being easily and cheaply formed; and in like manner the expanding means may be readily formed and applied to the reamer at a small cost, thus producing a spiral fluted expansion reamer suitable for all purposes, especially for the smaller kinds of repair work. The reamer is very simple in construction and has no complicated parts to become deranged or broken.

The reamer may be adjusted, in a limited way, to increase the diameter of the cutting ribs, and the latter, by being spirally disposed longitudinally of the axis of the reamer, will efficiently ream a bushing having oil grooves therein or other longitudinal openings, as the spiral cutting edge will bridge over the same and produce a clean, perfect bore therethrough. For the same reason, the reamer will not chatter or rattle in the bore of the bushing or other passageway, as will a reamer having straight longitudinal cutting edges, such chattering usually producing imperfect work. The pilot or guide at the front end of the reamer cuts straight into the hole or passageway and guides the same through correctly until the reaming is finished, the cutting teeth at that point centering the pilot accurately and slightly enlarging the same for the main pilot of the reamer to enter. This is of especial advantage when spaced bushings of automobile pistons are being reamed.

What is claimed is:—

1. A reamer having a cylindrical pilot portion at the forward end provided at its forward end portion with flutes having side cutting edges, each flute having an end cutting edge at its forward end, said reamer also having a shank at its rear end remote from the pilot portion, and an elongated fluted body portion between said shank and pilot portion and of a slightly greater diameter than the pilot portion, said pilot portion being long enough relative to its diameter to cause the pilot portion to lead true when the reamer is used as a hand tool or floating reamer.

2. A reamer having a cylindrical pilot portion at the forward end provided at its forward end portion with flutes having side cutting edges, each flute having an end cutting edge at its forward end, said reamer also having a shank at its rear end remote from the pilot portion, and an elongated fluted body portion between said shank and pilot portion and of a slightly greater diameter than the pilot portion, said pilot portion being long enough to reach from hole to hole of alined spaced apart holes, to permit the straight roughing out, enlarging and alining of said holes and reaming and finishing them straight and in true alinement, while using the reamer as a floating reamer and without withdrawing the reamer.

In testimony, that I claim the foregoing as my own, I have hereto affixed my signature.

MICHAEL I. SEILER.